United States Patent Office 2,891,942
Patented June 23, 1959

2,891,942
WATER-INSOLUBLE MONOAZO DYESTUFFS

Ernest Merian, Bottmingen, near Basel, Switzerland, assignor, by mesne assignments, to Saul & Co., Newark, N.J., as nominee of Fidelity Union Trust Company, executive trustee under Sandoz Trust No Drawing. Application July 2, 1956
Serial No. 595,128

Claims priority, application Switzerland July 13, 1955

7 Claims. (Cl. 260—207.1)

The present invention relates to new water-insoluble monoazo dyestuffs corresponding to the general formula

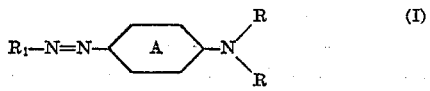

wherein the two R's stand for identical or different low molecular alkyl radicals which together possess at least one negative substituent and at least one —O-acyl radical containing 1 to 5 carbon atoms, $R_1$ stands for the radical of a mono- or binuclear diazo component free from water-solubilizing groups, preferably for a radical of a diazo component of the benzene, naphthalene or heterocyclic series, and wherein the nucleus A may carry further substituents commonly found in azo dyestuffs with the exception of water-solubilizing groups.

These new water-insoluble monoazo dyestuffs dye cellulose ester fibers (e.g. secondary acetate and triacetate), synthetic polyamide fibers (e.g. nylon), polyinvyl fibers, terephthalic acid ester fibers (e.g. Terylene,[1] Dacron[1]) and polyacrylonitrile fibers (e.g. Orlon,[1] Dynel,[1] Acrilan[1]) in orange, red and violet shades characterized by very good fastness to light, gas fume fading and sublimation. The wash fastness properties also are in some cases very good. Many of the new dyestuffs are also suitable for pigmenting lacquers, oils and synthetic resins, as well as for dyeing man-made fibers in solution prior to spinning.

The process for the production of the new water insoluble monoazo dyestuffs consists in coupling 1 mol of the diazo compound of an amine free from water-solubilizing groups and belonging to the benzene, naphthalene or heterocyclic series with 1 mol of a tertiary amine of the general formula

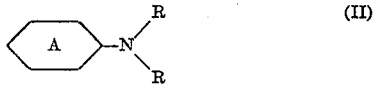

wherein R and A have the previously named significances, the coupling reaction being effected in the para-position to

The process may be carried out in another manner which is characterized by esterifying 1 mol of a monoazo compound of the general formula

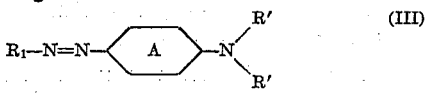

wherein $R_1$ and A have the above-named significances, and each R' stands for the same or a different low molecular alkyl radical, the two R' radicals together possessing at least one negative substituent and at least one hydroxyl group, with 1 mol of a functional derivative of an acid containing 1 to 5 carbon atoms.

As amines for use in the production of the diazo compounds, those suitable according to the present definition are amines of the benzene series (e.g. 1-amino-4-nitrobenzene, 1-amino-4-alkylsulfonylbenzene and their derivatives further substituted in the 2-position or in the 2- and 6-positions), amines of the naphthalene series (e.g. 1-amino-4-alkylsulfonylnaphthalene, 1-aminonaphthalene-4-sulfonic acid fluoride and their derivatives) and heterocyclic amines (e.g. 2-aminothiazole, 2-aminothiophene, 2-aminothiodiazole and their derivatives).

The tertiary amines of general Formula II contain according to definition at least one negative substituent in the N-alkyl radicals (e.g. a halogen atom or a nitrile, nitro or C-acyl group) and at least one O-acyl radical containing 1 to 5 carbon atoms. They may be further substituted in the 2- and/or 5-position of the benzene nucleus by halogen atoms or low molecular alkyl, alkoxy or acylamino groups, the hydrogen atoms of which may be wholly or partially replaced by fluorine if desired.

The coupling of the diazo compound with the azo component according to the first operating procedure of the process is effected preferably in acid medium and with advantage in presence of acid-binding agents. Upon separation, the monoazo dyestuffs are filtered off and washed.

The acylation of the monoazo compounds of general Formula III according to the second operating procedure of the process is conducted by the known methods with functional derivatives of an acid containing 1 to 5 carbon atoms, if desired in presence of an acid-binding agent and/or a diluent which has no effect on the reaction. It is often advantageous to raise the temperature. The monoazo dyestuffs thus formed are isolated by one of the common basic operations, for example, filtration, reduction of the solvent to a small volume followed by filtration, distilling off the solvent and filtration, or precipitation from the solvent with a suitable agent and subsequent filtration.

The further processing of the monoazo dyestuffs to give dyeing preparations can be carried out in different ways. For example, the dried dyestuff may be ground with a suitable dispersing agent, if desired in presence of filling agents, or alternatively it may be kneaded in paste form with a dispersing agent and subsequently dried in a vacuum or spray drier.

The new dyeing preparations are applied from aqueous suspension on hydrophobic fibers, preferably in presence of compounds with dispersing action and at elevated temperature. By mixing two or more monoazo dyestuffs conforming to the invention, the affinity of the resulting dyestuffs for the fiber is in some cases further improved.

The following examples show how the present process can be carried out. They are by no means limitative, however, as regards the choice of starting materials and the operating conditions. The parts refer to parts by weight, the temperatures are given in degrees centigrade, and the melting points are uncorrected.

Example 1

50 parts of 2-bromo-4-nitro-4'-(N-cyanoethyl-N-hydroxyethylamino)-1.1'-azobenzene together with 200 parts of acetic anhydride are heated to the boil in the course of 2 hours. After having cooled, small quantities of an impurity are filtered off and the filtrate diluted with 750 parts of ethyl alcohol. It is allowed to stand, whereupon which the new dyestuff crystallizes out. In the purified state the dyestuff melts at 116–120°. It ---
[1] Registered trademarks.

can be treated further in the normal manner, e.g. by grinding with a dispersing agent and sodium sulfate, to give a dyestuff preparation in powder form which dyes cellulose acetate and terephthalic acid ester fibers in bright scarlet shades which display outstanding fastness properties, the excellent fastness to light, gas fume fading and sublimation being especially notable.

Dyestuffs with similar properties but of more bluish shade can be produced in an analogous manner by acylation of 2-chloro-2'-acetylamino-5'-methoxy-4-nitro-4' - (N - cyanoethyl - N - hydroxyethylamino) - 1.1' - azobenzene, 2'-trifluoroacetylamino-4-nitro-4'-(N-difluoroethyl-N-hydroxyethylamino)-1.1'-azobenzene, 2-methylsulfonyl - 4 - nitro - 4' - (N - trifluoroethyl - N - hydroxyethylamino)-1.1'-azobenzene, 2-methylsulfonyl-4-nitro-4'- (N - ethyl - N - trifluorohydroxypropylamino) - 1.1'-azobenzene and 4-nitro-2'-methyl-4'-(N-cyanoethyl-N-hydroxyethylamino)-1.1'-azobenzene-2-sulfonic acid fluoride with acetic anhydride or propionic anhydride.

*Example 2*

20 parts of 1-methylsulfonyl-4-[2'-methyl-4'-(N-cyanoethyl-N-hydroxyethylamino)]-phenyl-azonaphthalene are stirred into 100 parts of acetic anhydride at 90° and the mixture maintained at this temperature for 2 hours. Hereupon 60 parts of acetic anhydride, which contains acetic acid are distilled off in a water jet vacuum. Upon cooling the new dyestuff crystallizes out of the solution. It is filtered off and washed free of acid with water. Upon recrystallization from a mixture of acetic acid ethyl ester and ethyl alcohol it is obtained in the chemically pure form with a melting point of 153–156°. The new dyestuff draws from aqueous dispersion onto cellulose acetate, synthetic polyamide fibers and terephthalic acid ester fibres, giving reddish orange shades.

A similar dyestuff is obtained when the starting dyestuff of the preceding example is replaced by an equimolar quantity of 4-[2'-methyl-4'-(N-cyanoethyl-N-hydroxyethylamino)]-phenylazonaphthalene-1-sulfonic acid fluoride. The latter-named monoazo dyestuff can be produced by diazotization of the 1-aminonaphthalene-4-sulfonic acid fluoride (melting point 146°), obtained by the action of fluorosulfonic acid on 1-aminonaphthalene-4-sulfonic acid, and subsequent coupling with 1-(N-cyanoethyl-N-hydroxyethylamino)-3-methylbenzene. In crystallized form its melting point is 134–136°.

*Example 3*

5 parts of sodium nitrite are added to 60 parts of pure sulfuric acid at 60°. The resulting nitrosyl sulfuric acid at 15° is diluted with 130 parts of pure acetic acid and in the mixture thus formed 15 parts of 1-methylsulfonyl-4-aminonaphthalene are diazotized. After the addition of 3 parts of urea the diazotizing mass is poured onto 250 parts of ice and coupled in the normal manner with 18 parts of 1-(N-cyanoethyl-N-acetoxyethylamino)-3-methylbenzene. The dyestuff thus obtained is identical with that of the first paragraph of Example 2.

The following table contains further water-insoluble monoazo dyestuffs which are obtainable according to the particulars given in Examples 1 to 3. They correspond to the general formula

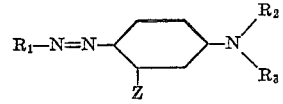

and are characterized by the symbols $R_1$, $R_2$, $R_3$ and $z$, by their melting points (M.P.) and by the shade of their dyeings on cellulose acetate and polyethylene terephthalate fibers.

| Example No. | $R_1$ | $z$ | $R_2$ | $R_3$ | M.P., degrees | Shade on Cellulose Acetate | Shade on Polyethylene Terephthalate Fibers |
|---|---|---|---|---|---|---|---|
| 4 | 4-nitro-2-trifluoromethylphenyl | H | 2-cyanoethyl | 2-acetoxyethyl | 122 | scarlet | red. |
| 5 | 4-nitro-2-methylsulfonylphenyl | H | do | do | 186 | red | red. |
| 6 | do | H | 2,2-difluoroethyl | do | 178 | | red. |
| 7 | 6-methoxybenzothiazolyl | 3-methyl | 2-cyanoethyl | do | 133 | scarlet | red. |
| 8 | 4-nitro-2-cyanophenyl | H | do | do | 139 | red | ruby. |
| 9 | 2,4-bis-(methylsulfonyl)-phenyl | H | do | do | 117 | orange | |
| 10 | 5-nitrothiazolyl | 3-methyl | do | do | 159 | violet | violet. |
| 11 | do | H | do | do | 160 | ruby | ruby. |
| 12 | 6-methylsulfonylbenzothiazolyl | H | do | do | 295 | pink | pink. |
| 13 | do | H | 2,2-difluoroethyl | do | 300 | do | Do. |
| 14 | 6-nitrobenzothiazolyl | H | 2-cyanoethyl | do | 201 | red | red. |
| 15 | 4-nitro-2-chlorophenyl | H | do | do | 122 | scarlet | scarlet. |
| 16 | do | H | do | 2-chloroacetoxyethyl | 155 | do | Do. |
| 17 | do | H | do | 2-proprionyloxyethyl | 102 | do | Do. |

Other dyestuffs according to the invention which dye cellulose acetate in fast orange shades are:

2.4 - bis - (methylsulfonyl) - 4' - (N - difluoroethyl - N - acetoxymethyl)-1.1'-azobenzene 2.4 - bis - (methylsulfonyl) - 4' - (N - trifluoroethyl - N - acetoxyethyl)-1.1'-azobenzene 2.4 - bis - (methylsulfonyl) - 2' - methyl - 4' - (cyanoethyl-N-acetoxyethyl)-1.1'-azobenzene 2.4 - bis - (methylsulfonyl) - 2' - ethyl - 4' - (cyanoethyl-N-acetoxyethyl)-1.1'-azobenzene 2.4 - bis - (methylsulfonyl) - 2' - methyl - 4' - (difluoroethyl-N-acetoxyethyl)-1.1'-azobenzene 2.4 - bis - (methylsulfonyl) - 2' - methyl - 4' - (N - ketoamyl-N-acetoxyethyl)-1.1'-azobenzene 2.4 - bis - (methylsulfonyl) - 2' - methyl - 4' - (N - nitropropyl-N-acetoxyethyl)-1.1'-azobenzene 2 - chloro - 4 - methylsulfonyl - 4' - (N - cyanoethyl - N - acetoxyethyl)-1.1'-azobenzene 2 - bromo - 4 - methylsulfonyl - 4' - (N - cyanoethyl - N - acetoxyethyl)-1.1'-azobenzene 2 - trifluoromethyl - 4 - methylsulfonyl - 4' - (N - cyanoethyl-N-acetoxyethyl)-1.1'-azobenzene Other dyestuffs according to the invention which dye cellulose acetate and polyester fibers in fast red shades are:

2 - cyano - 4 - nitro - 4' - (N - difluoroethyl - N - acetoxyethyl)-1.1'-azobenzene 2 - cyano - 4 - nitro - 4' - (N - trifluoroethyl - N - acetoxypropyl)-1.1'-azobenzene 2 - cyano - 4 - nitro - 4' - (N - trifluoroamyl - N - acetoxyethyl)-1.1'-azobenzene Other dyestuffs according to the invention which dye cellulose acetate and polyester fibers in fast scarlet shades are:

2 - chloro - 4 - nitro - 4' - (N - difluoroethyl - N - acetoxyethyl)-1.1'-azobenzene 2 - chloro - 4 - nitro - 4' - (N - trifluoroethyl - N - acetoxyethyl)-1.1'-azobenzene
2 - chloro - 4 - nitro - 4' - (N - ethyl - N - trifluoroacetoxypropyl)-1.1'-azobenzene
2 - chloro - 4 - nitro - 2' - methyl - 4' - (N - cyanoethyl - N-acetoxyethyl)-1.1'-azobenzene
2 - chloro - 4 - nitro - 2' - ethyl - 4' - (N - cyanoethyl - N-acetoxyethyl)-1.1'-azobenzene
2 - chloro - 4 - nitro - 2' - methyl - 4' - (N - difluoroethyl-N-acetoxyethyl)-1.1'-azobenzene
2 - chloro - 4 - nitro - 2' - methyl - 4' - (N - difluoroethyl-N-butyryloxyethyl)-1.1'-azobenzene
2 - chloro - 4 - nitro - 2' - methyl - 4' - (N - trifluoroethyl-N-valeryloxyethyl)-1.1'-azobenzene
2 - bromo - 4 - nitro - 4' - (N - difluoroethyl - N - acetoxyethyl)-1.1'-azobenzene
2 - bromo - 4 - nitro - 4' - (N - difluoroethyl - N - propionyloxyethyl)-1.1'-azobenzene
2 - bromo - 4 - nitro - 4' - (N - difluoroethyl - N - butyryloxyethyl)-1.1'-azobenzene
2 - bromo - 4 - nitro - 4' - (N - trifluoroethyl - N - valeryloxyethyl)-1.1'-azobenzene
2 - bromo - 4 - nitro - 4' - (N - cyanoethyl - N - acetoxybutyl)-1.1'-azobenzene
2 - bromo - 4 - nitro - 4' - (N - trifluoropropyl - N - acetoxypropyl)-1.1'-azobenzene
2 - bromo - 4 - nitro - 4' - (N - trifluoropropyl - N - bisacetoxypropyl)-1.1'-azobenzene
2 - bromo - 4 - nitro - 4' - (N - nitroethyl - N - acetoxyethyl)-1.1'-azobenzene
2 - bromo - 4 - nitro - 4' - (N - ketobutyl - N - acetoxyethyl)-1.1'-azobenzene Other dyestuffs according to the invention which dye cellulose acetate and polyester fibers in fast violet to blue shades are:

1 - (5' - nitro) - thiazolylazo - 2 - ethyl - 4 - (N - cyanoethyl-N-acetoxyethyl)-benzene
1 - (5' - nitro) - thiazolylazo - 2 - methyl - 4 - (N - difluoroethyl-N-acetoxyethyl)-benzene
1 - (5' - nitro) - thiazolylazo - 4 - (N - difluoroethyl - N-acetoxyethyl)-benzene
1 - (5' - nitro) - thiazolylazo - 2 - acetylamino - 4 - (N - cyanoethyl-N-acetoxyethyl)-benzene
1 - (5' - nitro) - thiazolylazo - 2 - trifluoroacetylamino - 4-(N-cyanoethyl-N-acetoxyethyl)-benzene
1 - (5' - nitro) - thiazolylazo - 2 - propionylamino - 4 - (N-cyanoethyl-N-acetoxyethyl)-benzene
1 - (5' - nitro) - thiazolylazo - 2 - chloro - 4 - (N - cyanoethyl-N-acetoxyethyl)-benzene
1 - (5' - nitro) - thiazolylazo - 2 - trifluoromethyl - 4 - (N-cyanoethyl-N-acetoxyethyl)-benzene Formulae of representative dyestuffs of the foregoing examples are as follows:

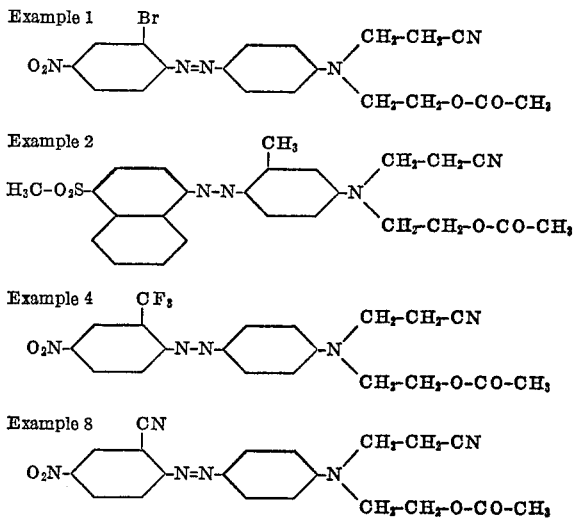

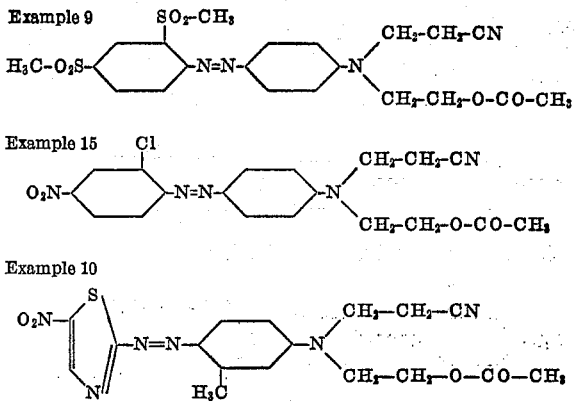

Example 18

A dyebath is prepared with 0.6 part of the dyestuff of Example 1 and dispersed with turkey red oil, 6 parts of a fatty alcohol sulfonate and 3000 parts of water. 100 parts of cellulose acetate are entered in the dyebath at room temperature, the dyebath then being heated to 80° in the course of 1 hour and maintained at this temperature for a further hour. After this time the dyeing process is completed. The material is removed, rinsed and dried. It is dyed in a scarlet shade which shows excellent fastness properties.

To improve its dispersibility the dyestuff may be previously ground with suitable wetting, dispersing or emulsifying agents, preferably in presence of an inorganic salt such as sodium sulfate. Alternatively it may be intimately mixed as an aqueous paste with a dispersing agent and then converted into a dyestuff powder by suitable drying.

Synthetic polyamide fibers are dyed by the method given in the foregoing at a temperature of 90° to 100°; terephthalic acid ester fibers are similarly dyed at 120° to 130° under pressure or at 90–100° in presence of carriers.

Having thus disclosed the invention what is claimed is:

1. Water-insoluble monoazo dyestuffs which correspond to the formula

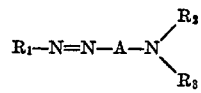

wherein $R_1$ stands for the radical of a diazo component selected from the group consisting of diazo components of the benzene and naphthalene series, A stands for a member selected from the group consisting of phenylene, lower alkylphenylene, acetylaminophenylene and trifluoroacetylaminophenylene radicals, and $R_2$ and $R_3$ stand for lower alkyl radicals possessing together at least one negative substituent and one O-acyl radical, acyl being carboxylic acyl containing 1 to 5 carbon atoms, and the said negative substituents being selected from the group consisting of a halogen atom, the nitrile group, the nitro group and a C-acyl group.

2. Water-insoluble monoazo dyestuffs which correspond to the formula

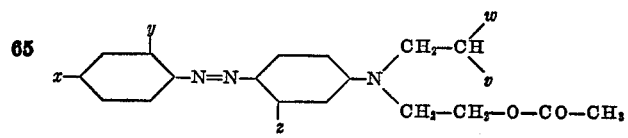

wherein $v$ stands for a member selected from the group consisting of hydrogen and fluorine, $w$ stands for a member selected from the group consisting of fluorine and cyano, $x$ stands for a member selected from the group consisting of nitro and methylsulfonyl, $y$ stands for a member selected from the group consisting of hydrogen, chlorine, bromine, cyano, trifluoromethyl, methylsulfonyl and the sulfonic acid fluoride group, and $z$ stands for a member selected from the group consisting of hydrogen and methyl.

3. The monoazo dyestuff of the formula

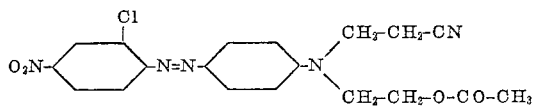

4. The monoazo dyestuff of the formula

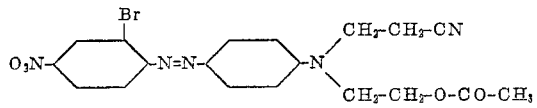

5. The monoazo dyestuff of the formula

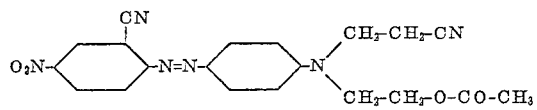

6. The monoazo dyestuff of the formula

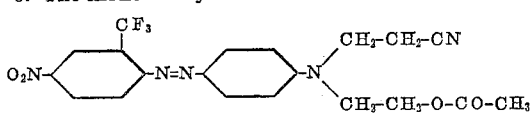

7. The monoazo dyestuff of the formula

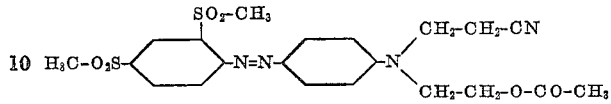

References Cited in the file of this patent

UNITED STATES PATENTS

| | | |
|---|---|---|
| 2,173,417 | Huber | Sept. 19, 1939 |
| 2,470,094 | Dickey et al. | May 17, 1949 |
| 2,491,481 | Dickey | Dec. 20, 1949 |
| 2,492,971 | Dickey et al. | Jan. 3, 1950 |
| 2,723,264 | Dickey et al. | Nov. 8, 1955 |

FOREIGN PATENTS

| | | |
|---|---|---|
| 1,098,546 | France | Mar. 9, 1955 |

UNITED STATES PATENT OFFICE

CERTIFICATE OF CORRECTION

Patent No. 2,891,942                                June 23, 1959

Ernest Merian

It is hereby certified that error appears in the above numbered patent requiring correction and that the said Letters Patent should read as corrected below.

In the grant, (only), line 1, name of inventor, for "Ernest Meriam" read -- Ernest Merian --; column 5, lines 60 to 65, in the formula, and lines 66 to 70, in the formula, for that portion reading "-N-N-", each occurrence, read -- -N=N- --.

Signed and sealed this 17th day of November 1959.

(SEAL)
Attest:
KARL H. AXLINE
Attesting Officer

ROBERT C. WATSON
Commissioner of Patents